Dec. 5, 1967     W. F. GALEY     3,356,479
METHOD OF CONTROLLING THE THICKNESS OF FLOAT GLASS
Filed Nov. 25, 1966     2 Sheets-Sheet 1
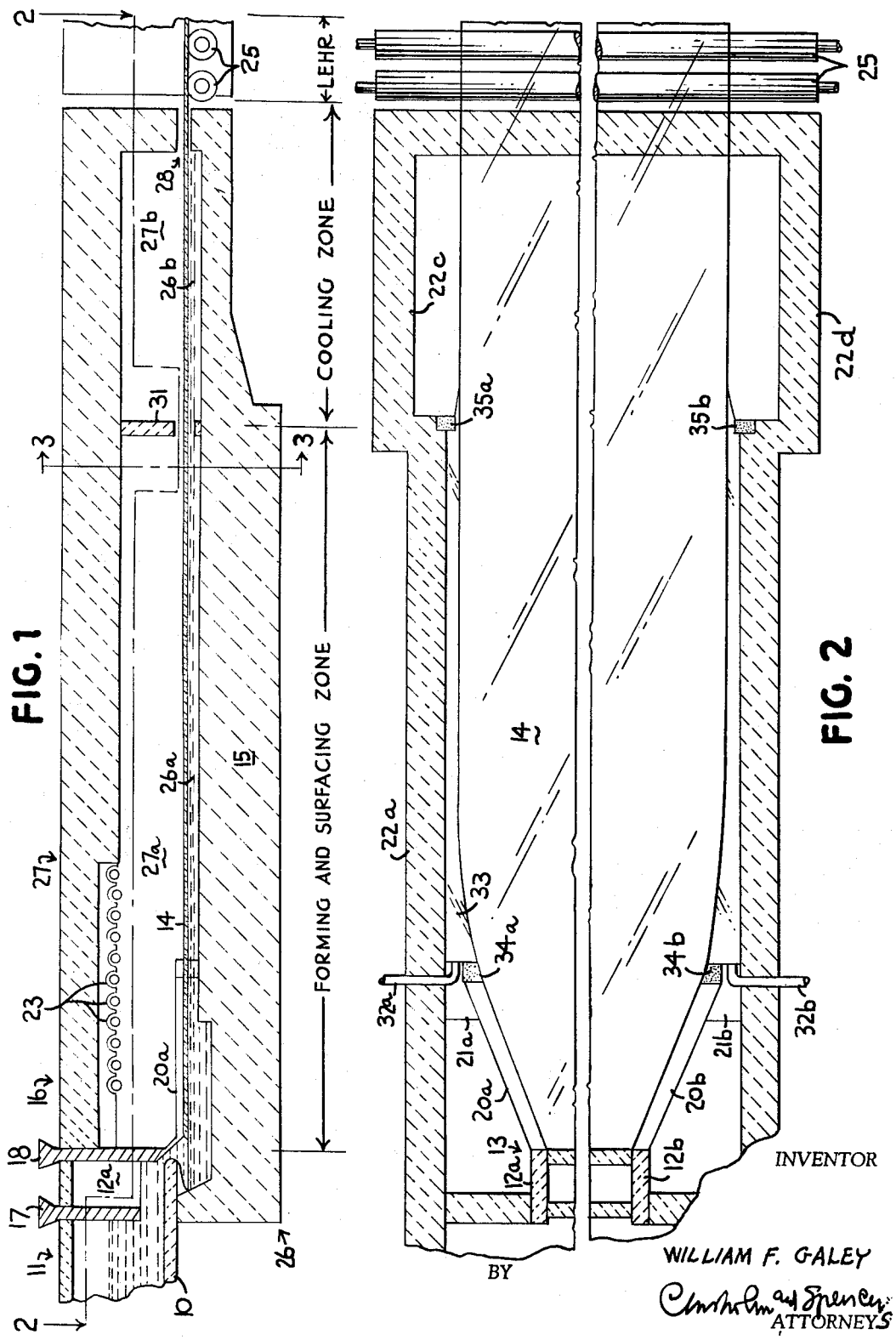
INVENTOR
WILLIAM F. GALEY
ATTORNEYS Dec. 5, 1967  W. F. GALEY  3,356,479
METHOD OF CONTROLLING THE THICKNESS OF FLOAT GLASS
Filed Nov. 25, 1966  2 Sheets-Sheet 2

INVENTOR
WILLIAM F. GALEY
BY Christopher ad Spencer
ATTORNEYS

United States Patent Office 3,356,479
Patented Dec. 5, 1967

3,356,479
METHOD OF CONTROLLING THE THICKNESS OF FLOAT GLASS
William F. Galey, Saxonburg, Pa., assignor to Pittsburgh Plate Glass Company, Pittsburgh, Pa., a corporation of Pennsylvania
Filed Nov. 25, 1966, Ser. No. 597,032
12 Claims. (Cl. 65—99)

This application is a continuation-in-part of my copending application, Ser. No. 366,961, filed May 13, 1964 now abandoned, entitled, "Manufacture of Glass."

This invention relates to the manufacture of flat glass by floating glass on a liquid bath, such as molten metal, so that the resultant flat glass has fire-finished surfaces requiring little or no additional surfacing for ultimate use.

It has been proposed heretofore to produce flat glass by floating a ribbon or sheet of glass upon the surface of a bath of molten metal. One of the earliest disclosures is the United States Letters Patent No. 710,357 issued to Heal. The product produced by the process has surfaces which differ somewhat from each other. The top surface of the glass, because of the heat involved in performing the process, has a fire-finished surface. The bottom of the ribbon is in contact with the molten metal. The bottom surface is flat and has an appearance similar to a fire-finished surface.

When producing float glass, as the product is known in the trade today, and using compositions approaching that of commercial plate and window glass or similar soda-lime glasses, and using a molten metal such as a bath of tin or tin alloy, molten glass poured directly onto the bath of metal and freely floating thereon ultimately will attain equilibrium at a thickness called "equilibrium thickness." The exact thickness attained by the glass at equilibrium depends upon the composition of the glass and the metal bath. For soda-lime glass and a tin or predominantly tin bath, the equilibrium thickness of a freely floating layer of glass is about 0.27 inch, i.e., very close to ¼ inch. Even a preformed ribbon of glass of a thickness different from the equilibrium thickness when remelted while supported on the molten metal will seek the equilibrium thickness.

Ribbons or layers of glass thinner than the equilibrium thickness, which are much in demand, may be obtained by attenuating an equilibrium thickness ribbon, as by applying a downstream tractive force to an already stable portion of a continuous ribbon, the force being in excess of that necessary to merely convey the formed ribbon from the metal bath. The quality of a ribbon less thickness than equilibrium produced by attenuation of the glass is relatively poor when compared with a ribbon formed in the absence of attenuation. The ribbon in being attenuated narrows appreciably in width, so that to produce a relatively wide ribbon requires a much wider buoyant bath to accommodate the initial width. Temperature differentials transversely of the ribbon which occur during attenuation manifest themselves as ribs or the like, so that there are produced variations in ribbon thickness and surface irregularities.

A ribbon of a trickness different from the described equilibrium thickness can also be produced by other methods, and the glass so produced is substantially equal in quality to the equilibrium thickness glass. For example, the apparent weight density of the glass with respect to the weight density of the metal can be modified in accordance with the teachings in the copending applications of Edmund R. Michalik, Ser. No. 188,664, filed Apr. 19, 1962, now abandoned, and Ser. No. 251,682, filed Jan. 15, 1963, now Patent No. 3,241,939, issued Mar. 22, 1966. The modification of the apparent weight density of the glass with respect to the weight density of the metal may be accomplished effectively by selectively applying over the floating glass or a portion thereof a fluid pressure that is different from the fluid pressure applied to the surface of the metal in contact with but not covered by the glass and/or to the remaining portions of the floating glass, such as the edges of the glass ribbon. For most purposes, it is found preferable to apply this different fluid pressure only to a portion of the surface of the glass layer and to leave a margin, generally a pair of opposed margins, of the glass layer exposed to another fluid pressure which may be the same as or different from that applied to the metal surface at the glass edge. As a result, of course, the margins differ in thickness from the portion to which the different fluid pressure is applied. By selecting the magnitude of the pressure on the central areas of the glass, a layer of any preformed thickness may be maintained at that thickness. If the layer is of a thickness other than that which is desired, then, because of the character of molten glass to flow, a ribbon of a desired thickness can be produced by proper selection of the pressure which modifies the apparent densities of the glass with respect to the bath of molten metal.

Glass of other than equilibrium thickness can also be produced by supporting the layer of molten glass on a bi-level metal bath where the central portion of the ribbon or layer of glass is supported at a different level from the edges of the glass. As disclosed in the copending application of George W. Misson, Ser. No. 316,311, filed Oct. 15, 1963, the central portion of a layer of molten glass may be supported at a higher level than the marginal edge portions by longitudinally dividing the tank containing the buoyant molten metal into three compartments with non-wettable upstanding walls of a height equal to the desired level of the central compartment. The marginal portions of the glass layer supported on the metal in the two outer compartments assume an equilibrium thickness and the central portion of the glass layer assumes a thickness that is less than the equilibrium thickness by the difference in the bath levels, which difference in bath levels is less than the equilibrium thickness of the glass.

The present invention provides a method for producing float glass of thickness differing from equilibrium thickness without attenuation of the ribbon, without the modification of apparent weight density of the glass with respect to the metal bath and the problems involved therein, and also without the use of a multilevel buoyant bath.

According to the present invention, molten glass is discharged from a tank onto a bath of molten metal confined for a distance by diverging walls, so that the glass spreads as a layer onto the bath of molten metal and covers the entire metal bath between the diverging walls throughout their length. The glass is flowable, for example, at a temperature of from 1700° F. to 2100° F. for soda-lime glasses, during its passage between the diverging walls. The width of the bath abruptly widens at the terminal ends of the diverging walls, so that thereafter the ribbon of glass moves without restraint from walls to a discharge location. The glass is permitted to achieve its finish and is temperature conditioned, so as to discharge from a defined zone at a temperature below which significant attenuation will not occur, but above its bending temperature, as for example, from 1200° F. to 1400° F. for soda-lime glasses. After discharge from the defined zone, the finished glass is removed from the molten metal bath for use or fabrication. Sufficient tractive force is applied to the glass ribbon to maintain its movement over the metal bath, but the tractive force applied is not sufficient to materially attenuate the ribbon.

In the defined zone, above referred to, and into which the glass is discharged from the diverging walls, a material having a density less than that of the bath, which wets the defining side walls of the zone and contacts the glass covers the entire metal bath outside the confines of the glass layer in the zone. The material is liquid at the temperature at which the glass layer is discharged from the defined zone, so that the glass can be easily removed from the zone. Adherence of the material to the edge of the glass after the glass is discharged from the zone is of little consequence because the edge of the formed ribbon is generally trimmed and discarded. The layer of material effectively couples the glass layer to the walls of the container for the molten material in the defined zone.

The edge material can be of less density, or greater density, or the same density as the glass. However, there are certain characteristics in addition to the density and the melting temperature of the edge material before mentioned, to be considered. These characteristics are the interfacial surface tensions of the material with respect to the glass and the metal of the bath, and its surface tension with the atmosphere, and for each density relationship, there are at least two inequalities which must be satisfied to obtain the results desired.

These inequalities can be expressed mathematically if the numbers 1, 2, 3, 4 are assigned to the metal bath, the edge material, the atmosphere, and the glass, respectively, so that the surface tensions, denoted by S with the proper subscript, between the edge material and the metal bath is $S_{1-2}$; between the glass and the metal bath is $S_{1-4}$; between the glass and the edge material is $S_{2-4}$; between the edge material and the atmosphere is $S_{2-3}$; and between the glass and the atmosphere is $S_{3-4}$.

When the density of the glass is greater than the density of the edge material, the surface tension between the edge material and the metal bath must be less than the sum of the surface tension between the edge material and the glass and the surface tension between the glass and the metal bath, and the surface tension between the glass and the atmosphere must be less than the sum of the surface tension between the edge material and the glass and the surface tension between the edge material and the atmosphere. These inequalities may be expressed as:

$$S_{1-2} < S_{2-4} + S_{1-4}$$
$$S_{3-4} < S_{2-4} + S_{2-3}$$

When the density of the glass is less than the density of the edge material, the surface tension between the edge material and the atmosphere must be less than the sum of the surface tension between the edge material and the glass and the surface tension between the glass and the atmosphere, and the surface tension between the glass and the metal bath must be less than the sum of the surface tension between the edge material and the glass and the surface tension between the edge material and the metal bath. These inequalities may be expressed as:

$$S_{2-3} < S_{2-4} + S_{3-4}$$
$$S_{1-4} < S_{2-4} + S_{1-2}$$

When the densities of the glass and the edge material are the same, there are three sets of two inequalities which pertain. To achieve the results one set of two inequalities must be satisfied at any one time.

Thus when the densities of the glass and the edge material are equal, (I) the surface tension between the glass and the metal bath must be less than the sum of the surface tension between the edge material and the glass and the surface tension between the edge material and the metal bath, and the surface tension between the glass and the atmosphere must be less than the sum of the surface tension between the edge material and the glass and the surface tension between the edge material and the atmosphere, or (II) the surface tension between the edge material and the metal bath must be less than the sum of the surface tension between the edge material and the glass and the surface tension between the glass and the metal bath, and the surface tension between the edge material and the atmosphere must be less than the sum of the surface tension between the edge material and the glass and the surface tension between the glass and the atmosphere, or (III) the surface tension between the edge material and the glass must be less than the sum of the surface tension between the glass and the metal bath and the surface tension between the edge material and the metal bath, and the surface tension between the edge material and the glass must be less than the sum of the surface tension between the glass and the atmosphere and the surface tension between the edge material and the atmosphere. These sets of inequalities may be expressed as:

(I) $\quad S_{1-4} < S_{2-4} + S_{1-2}$
$\quad\quad S_{3-4} < S_{2-4} + S_{2-3}$
(II) $\quad S_{1-2} < S_{2-4} + S_{1-4}$
$\quad\quad S_{2-3} < S_{2-4} + S_{3-4}$
(III) $\quad S_{2-4} < S_{1-4} + S_{1-2}$
$\quad\quad S_{2-4} < S_{3-4} + S_{2-3}$ When the set of inequalities is met for the particular density relationship, the glass or the edge material will not run over or under the other, as the case may be.

In accordance with the inventive concepts herein disclosed, an increase or decrease in the thickness of the coupling layer of material will result in an increase or decrease, respectively, in the thickness of the layer of glass. An effective and relatively simple control of glass thickness is thus provided.

Except for wetting the glass and the tank walls and being less dense than the metal of the bath, as described, the edge material must be substantially chemically inert with respect to the glass, the material of the tank, the metal of the bath, and the atmosphere, either that encountered within or outside the tank. Also, the edge material must be stable at the operating temperatures; in other words, it should have a low vapor pressure.

It is possible, within the inventive concepts described herein to control glass thickness by choosing edge materials of various surface tensions and of various densities and operating with different edge material thicknesses, because by varying these values, the thickness of the main glass body can be varied. Of course changing the thickness of the edge material is by far the simplest method to pursue.

The method for producing flat glass according to this invention can be summarized as permitting molten glass to spread and form a layer of glass having relatively smooth surfaces on a bath of molten metal confined by side walls of a tank, applying lateral forces to the glass of the layer by coupling the layer of glass to the side walls, the magnitude of the forces determining the ultimate thickness of the layer, selecting the magnitude of the forces to select the ultimate thickness of the layer, stabilizing a layer of glass on the bath, uncoupling the stabilized layer from the side walls and thereafter removing the stabilized layer from the bath of molten metal.

The coupling of the layer of glass to the side walls is accomplished by fluid or hydrostatic forces which are a function of density and thickness and also surface tension forces. The surface tension forces do not change for any material as the material is being stretched, since it is a constant independent of surface area. But the thickness of the coupling layer is changed, so there is a change in hydrostatic forces which is a function of thickness.

To further understand the invention, attention is now directed to the accompanying drawings, in which;

FIG. 1 is a longitudinal section of an apparatus for producing glass according to the inventive process herein contemplated, showing means for depositing a layer of glass upon a molten bath;

FIG. 2 is a horizontal sectional view taken on line 2—2 of FIG. 1;

Figure 3:
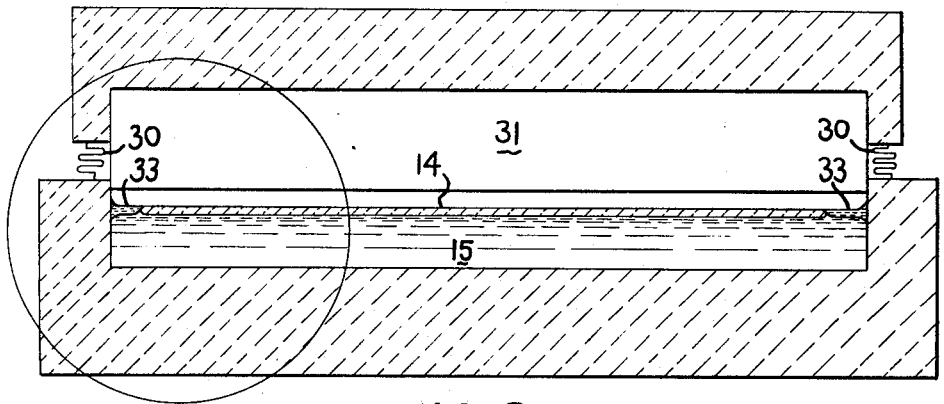
FIG. 3 is a sectional view taken on line 3—3 of FIG. 1.
Figure 4:
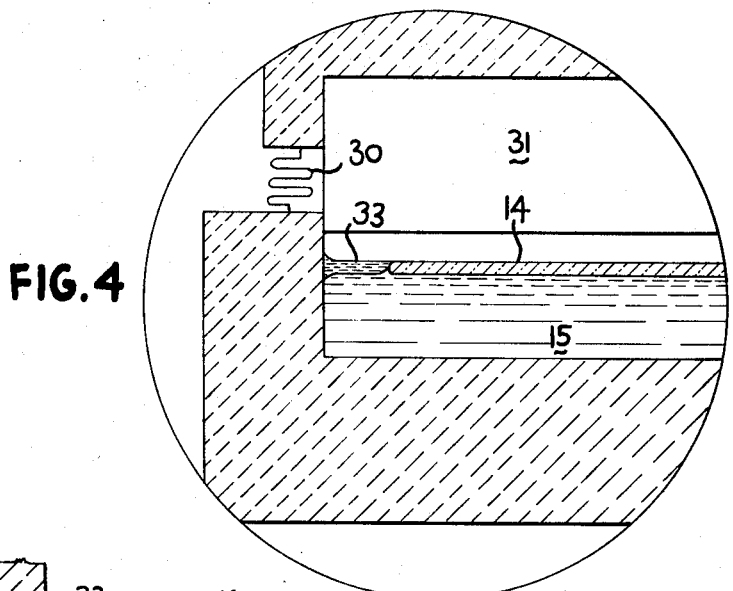
FIG. 4 is an enlarged view of that portion of FIG. 3 within the circle and showing the glass layer coupled to the side walls of the tank when the edge material is of the same density as the glass.
Figure 5:
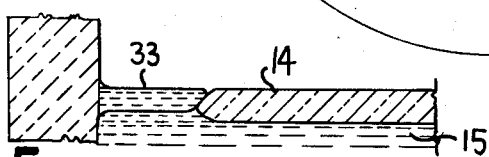
FIG. 5 shows the coupling of the glass to the side walls of the tank when the material is of less density than the glass.
Figure 6:
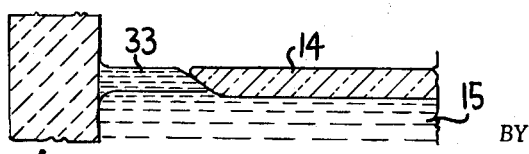
FIG. 6 shows the coupling of the glass to be side walls of the tank when the material is of greater density than the glass.

With particular reference to the drawings and especially FIGS. 1 to 3, there is shown a floor or lip 10 of a glass melting furnace 11 which, with side jambs 12a and 12b, forms a spout 13 of generally rectangular cross section at the delivery end of the furnace 11. Glass discharging from the spout 13 forms a layer of molten glass 14 on the surface of a bath of molten metal 15 contained within a tank 16. The metal may be tin, an alloy of tin, or the like, so long as it is of greater density than the glass discharged thereon and substantially immiscible and non-reactive with the glass. A glass flow regulating tweel 17 and a gate 18, each adjustably suspended in a conventional manner, cooperate with the spout 13 and control the flow of glass from the furnace 11 to the molten metal bath 15.

The molten metal bath 15 is confined within a tank 16 which includes refractory side walls 20a and 20b diverging from the spout 13 and terminating in short stub walls 21a and 21b. The stub walls 21a and 21b join side walls 22a and 22b which in turn join side walls 22c and 22d. The tank 16 is thus stepped in width from one end to the other, as is shown especially in FIG. 2. The side walls of the tank 16 are preferably constructed of a suitable refractory material.

In order to maintain the metal of the bath 15 in molten condition and to thermally control the ribbon near the entrance end of the tank 16 thermal regulating means, such as radiant heaters 23 are located in the roof of the tank 16, as illustrated in the drawings. The radiant heaters 23 are connected to a suitable source of power (not shown) in a conventional manner. Each heater may be individually energized and controlled, so as to provide a desired thermal gradient within the tank 16.

The glass 14 in finished ribbon form is withdrawn from the tank 16 without injury to its surfaces by the traction roll of a roller conveyor 25. The rolls provide sufficient traction to remove the glass 14 but insufficient to attenuate the glass.

The tank 16 is constructed of a bottom portion 26 and a top portion 27 joined except for the entrance and an exit 28 by suitable means such as that shown, which includes bellows 30. This type of construction, shown for illustrative purposes, permits the top portion 27 of the tank to be raised from the bottom portion 26 for repairs, etc., without the necessity of removing refractory parts and the subsequent repair of removed parts. The bottom portion 26 of the tank 16 contains the molten metal bath 15 and includes the various described side walls. The bottom portion 26 contains a forming and surfacing zone 26a and a cooling zone 26b, these zones being present because of the temperatures involved. The metal level is maintained in any suitable manner.

The top portion 27 of the tank 16 is also divided into two major sections; i.e., the section 27a which is coextensive with and corresponds to the forming and surfacing zone and the section 27b which is coextensive with and corresponds to the cooling zone. The sections 27a and 27b are separated by a depending wall 31. One important aspect of the present invention is to temperature condition the glass within the forming and surfacing zone, so that at the exit therefrom the glass is at a temperature which permits bending thereof but at which the glass cannot be attenuated. This can be accomplished by use of the radiant heaters 23 as shown in the drawing, and by the natural gradient downstream of these heaters.

In addition to the structure thus described, there are inlet conduits 32a and 32b passing through the stub walls 21a and 21b, respectively, and terminating at just about the level of the bath 15. These conduits are connected at their opposite ends to a suitable source of a material through a metering device, such as a metering pump of known construction (not shown), which material has a density less than that of the metal of the bath 15 and which will wet or adhere to the walls 22a and 22b and also the lateral edges of the glass 14. The material must also be liquid at the terminus of the walls 22a and 22b, so that the glass can freely move into the cooling zone. Thus, at a temperature at which the glass is bendable but cannot be attenuated, the material indicated on the drawings as 33 must be liquid.

In order to liberate the glass from the diverging walls 20a and 20b, there are nose blocks 34a, 34b of a non-wettable material, such as graphite at the terminal ends of the walls. Nose blocks 35a and 35b of non-wettable material, such as graphite, are also provided at the ends of the walls 22a, 22b to prevent the lapping of the material 33 therearound. The nose blocks 35a and 35b preferably protrude toward the glass ribbon to form a reservoir to substantially confine the material 33.

As previously stated, the thickness of the layer of material 33 determine the ultimate thickness of the glass removed from the bath 15, i.e., the thickness of the layer determines the magnitude of the lateral force applied to the glass. The metering pump provides a mechanism by which the thickness of the layer of the material 33 can be established maintained and/or changed. The material 33 provides a coupling of the glass 14 to the side walls 22a and 22b of the tank 16, such that the lateral forces can be transmitted therebetween.

As in previous methods of producing glass by floating a mass of glass on the surface of a bath of molten metal, a protective atmosphere is preferably used to prevent the oxidation of the entire exposed surface of the bath and the contamination of the glass surfaces because of such oxidation. The area of exposed bath surface in the process described herein is materially reduced because the edge material 33 must, to provide the coupling, cover the entire bath outside the confines of the glass where forming and sizing is being accomplished and until the glass is at a temperature at which little or no attenuation occurs.

In the operation of the described device, molten glass from the tank 11 is deposited from the spout 13 onto the metal bath 15 between and spreads to contact the diverging walls 20a and 20b. The layer of molten glass spreads out somewhat as it passes the terminal ends of the walls 20a and 20b. The ultimate width of the final ribbon of glass is determined and fixed as the glass passes through the forming and surfacing zone.

The edge material 33 is fed through the conduits 32a and 32b onto the surface of the bath 15 of molten metal outside the lateral edges of the glass 14, so as to cover the entire surface of the bath between the walls 22a and 22b and the lateral edges of the glass. This material is chosen so as to float on the metal of the bath and wet the walls 22a and 22b of the tank and contact the edges of the glass. The material 33 effectively couples the glass to the side walls of the tank 16. By choosing the thickness of the layer of material 42, the thickness of the glass ribbon ultimately produced can be chosen. Thus it is possible to produce glass of thickness differing from and larger or smaller than equilibrium thickness using the teachings of this invention.

As the glass layer moves within the zone 26a of the tank 16, its temperature is reduced to a temperature at which it can bend but below that at which it can be attenuated. However, the glass is permitted to level out so as to form a flat ribbon of glass and is subjected to temperatures sufficient to produce fire-polished surfaces which require little, if any, additional surfacing for ultimate use. The temperature of the material 33 is also reduced from its entry to its exit. However, the material at its exit must be flowable, so that the glass is easily separated therefrom and the coupling is broken. The fact that a certain quantity of the material adheres to the glass edges is of little consequence because the edge of the glass is generally trimmed when the glass is cut into discrete sheets.

After breaking the coupling when the glass passes into the cooling zone, the glass is further cooled, so that it can be removed from the bath without damage to its surfaces. The tractive force applied to the glass by the roll conveyor 25 is sufficient to remove the glass from the bath but not sufficient to attenuate the glass. The glass ribbon is then conveyed by the roller conveyor 25 into, if necessary, an annealing lehr (not shown) where stress and strain in the glass are relieved. The glass is then edge trimmed and cut into discrete sheets for packaging, shipping and fabrication or use.

The process of this invention has been described with reference to the formation of a ribbon on the surface of a molten bath of metal. It is to be understood that the process is applicable to a preformed ribbon of glass delivered on the surface of the bath. If the preformed ribbon is of a thickness other than that desired, it can be processed to a desired thickness and surfaced as well. If the preformed ribbon is of the desired thickness, it can be surfaced and maintained at the desired thickness. Of course, the desired thickness will generally be different from the normal equilibrium thickness.

One example of an edge material which can be used in the described process is the alkali metal salt sodium molybdate having the chemical formula $Na_2MoO_4$. This salt has a density of 2.50 grams per cubic centimeter at 2000° F. and a surface tension to the atmosphere at the same temperature of 214 dynes per centimeter. The surface tension of the salt to molten tin is 400 dynes per centimeter. Sodium molybdate has a melting point of 1269° F.

*Example I*

Molten glass at a temperature of approximately 2100° F. is discharged at a constant rate from a spout 12 inches wide directly upon a molten metal bath of 100 percent tin having a weight density of 6.50 grams per cubic centimeter at 1800° F. The glass has a composition, by weight, of 71.38 percent $SiO_2$; 13.26 percent $Na_2O+K_2O$; 11.76 percent CaO; 2.54 percent MgO; 0.75 percent $Na_2SO_4$; 0.15 percent $Al_2O_3$; 0.11 percent $Fe_2O_3$ and 0.06 percent NaCl and a weight density of 2.40 grams per cubic centimeter. The surface tension of the glass to the atmosphere is 318 dynes per centimeter at 2000° F.

The tank of molten metal is of the construction illustrated in FIGS. 1 and 2 of the drawing and is divided into a forming and surfacing zone and a cooling zone. The metal in the cooling zone is maintained with a temperature gradient of 1900° F. to 1200° F. from the spout to the ends of the side walls 22a and 22b. In the cooling zone the metal ranges from 1200° F. to 1000° F. in the direction of glass travel.

The radiant heaters above the bath are adjusted to maintain the recited temperature gradient.

Sodium molybdate, having a density of 2.50 grams cubic centimeter at 2000° F., a surface tension to the atmosphere of 214 dynes per centimeter at 2000° F., a melting temperature of 1269° F. is fed onto the surface of the metal bath and covers that portion of the bath outside the edges of the glass coextensive with the side walls 22a and 22b. The material is discharged so as to maintain a layer 0.0394 inch in thickness and wets the walls 22a and 22b of the tank and contacts the edges of the glass. The resultant glass removed from the tank is .227 inch in thickness.

*Example II*

The same procedure as set forth above is followed except that the sodium molybdate is discharged to maintain a layer 0.353 inch in thickness. The resultant glass removed from the tank is 0.420 inch in thickness.

The table below sets out the various glass thicknesses produced by using particular thicknesses of sodium molybdate as the edge material:

| Thickness $Na_2MoO_4$ (in inches) | Glass thickness (in inches) |
|---|---|
| Approaching 0 | .220 |
| .0394 | .227 |
| .0787 | .234 |
| .118 | .250 |
| .147 | .272 |
| .197 | .296 |
| .236 | .324 |
| .276 | .354 |
| .314 | .386 |
| .353 | .420 |
| .394 | .454 |

From the reproduced table, it can be concluded that when the thickness of the glass is at its equilibrium thickness, the edge material will also be at its equilibrium thickness. Moreover, it can be concluded that thickness less than and also greater than equilibrium thickness can be obtained by choosing the thickness of the edge material.

It will be understood that various other liquids may be used as edge materials in lieu of the above-mentioned sodium monomolybdate. Generally speaking, the liquid resting on the molten metal at the edges of the glass and in contact with the walls of the container should have the following characteristics:

It should be molten at glass forming temperatures, i.e., melt at about 1200° F. It should be substantially nonvolatile at glass forming temperatures, i.e., in a range of about 1200 to 2000° F. It should be stable at these temperatures. It should be capable of wetting the walls of the chamber, and may have a low solubility in the glass, for example, the glass may be capable of dissolving at least 0.01 to 0.1 gram but not more than 1 to 10 grams of salt per thousand grams of glass.

Among the other edge materials the following are contemplated (preferably salts of metals in the alkali metal group above lithium):

Other alkali metal monomolybdates such as potassium monomolybdate or mixtures of two or more alkali monomolybdates, for example, mixtures of potassium and sodium monomolybdates which become molten below about 1300° F.

Phosphomolybdates including melts prepared by mixing $MoO_3$ with sodium metaphosphate or like alkali metal metaphosphate to reduce the melting point of the molybdenum oxide.

Salts of polymolybdic acids having the formula $$(M_aO_b)(MoO_3)x$$

where $x$ is a number (including fractional numbers) larger than one and $a$ and $b$ are small whole numbers denoting the respective valence of the metal M. Typical polymolybdates are the alkali metal polymolybdates having the formula $A_2O(MoO_3)x$, where A is the alkali metal preferably above lithium in the alkali metal series. As a typical example potassium polymolybdates containing in excess of about 30 and less than 90 mole percent $MoO_3$ are contemplated.

Alkali metal tungstates and polytungstates such as those having the formula $Na_2O(WO_3)x$, where $x$ is a number (including fractional numbers) equal to or greater than one and the corresponding potassium salts or mixtures of the sodium and potassium salts are contemplated, for example, sodium polytungstates containing 20 to 37 percent $WO_3$ or potassium polytungstates containing 35 to 55 mole percent of $WO_3$.

Other similar alkali metal salts of inorganic heteropolyacids may also be used such as alkali metal tungstomolybdates.

In addition to the aforementioned alkali metal salts, it has also been found that low melting point borosilicate glasses having the composition by weight:

| | Percent |
|---|---|
| $Na_2O$ | 17–26 |
| $SiO_2$ | 33–42 |
| $B_2O_3$ | 28–38 |
| $Na_2SiF_6$ | 0–13 |
| $NaF$ | 0–5 | can be used with the usual soda-lime-silica glass disclosed in Example I, i.e., 71.38 percent $SiO_2$; 13.26 percent $Na_2O+K_2O$; 11.76 percent $CaO$; 2.54 percent $MgO$; 0.75 percent $Na_2SO_4$; 0.15 percent $Al_2O_3$; 0.11 percent $Fe_2O_3$ and 0.06 percent $NaCl$, and a weight density of 2.40 grams per cubic centimeter, to produce a glass ribbon having a thickness differing from that normally obtained when this glass is flowed onto molten tin, i.e., 0.271 inch.

The glass edge materials have softening points in the range of 975° F.–1050° F., densities of about 2.48 grams per cubic centimeter at 68° F., and surface tensions to the atmosphere of about 200 to 205 dynes per centimeter at 68° F. Their equilibrium thickness on molten tin ranges from about 0.190 to 0.210 inch.

As with the other edge materials enumerated, when the soda-lime-silica glass thickness is equilibrium, the glass edge material will also be at its equilibrium. By choosing the thickness of the edge material, the thickness of the main glass can be chosen.

*Example III*

The same procedure as set forth above in Example I is followed except that a glass edge material having the composition calculated by chemical analysis of 17.0 percent $Na_2O$; 33.0 percent $SiO_2$; 37.5 percent $B_2O_3$; 12.5 percent $Na_2SiF_6$ is substituted for the sodium molybdate. The enumerated glass has a softening temperature of 1017° F., a density of 2.48 grams per cubic centimeter at 68° F., a surface tension to the atmosphere of 202.4 dynes per centimeter at 68° F. and an equilibrium thickness on tin of 0.205 inch.

The glass edge material is discharged along the main body of glass to maintain a layer averaging about 0.330 inch in thickness. The resultant glass of the ribbon is removed from the tank and its thickness is measured to be 0.350 inch.

The thicknesses of the main glass and the glass edge material vary in a straight line relationship; thus by plotting the equilibrium thicknesses and the thicknesses in the example, the numerical relationship of thicknesses can be obtained.

Rarely does the density of the edge material differ from that of the glass processed by a factor of more than plus or minus 20 percent to 50 percent based upon the density of the glass. For example, where the glass has a density of 2.40 grams per cubic centimeter, the density of the edge material rarely should be more than 3.60 grams per cubic centimeter, and rarely is the density of the edge material less than 1.20 grams per cubic centimeter.

The width of the layer of edge material, i.e., that dimension between the glass and the tank wall, should be more than a film, and generally should be at least ¼ inch and, preferably about 1 inch or more.

What is claimed is:

1. In a method of forming flat glass wherein a layer of molten glass is supported on a bath of molten metal contained between side walls of a tank in a controlled atmosphere, the improvement which comprises, selecting an edge material other than said glass of a density and interfacial surface tension relationship to the atmosphere, bath and glass such that when in contact with the glass and walls the thickness of the molten glass body is controlled by the depth of the material and said material does not run over or under said glass and said glass does not run over or under said material, said material being substantially chemically inert with respect to said glass and said bath, floating a layer of said material on the metal bath between the molten glass and the side walls, so as to contact both said glass and said walls, covering the entire surface of the bath outside the margins of the glass with said material for at least that portion of the tank in which said glass can flow, cooling the glass at the thickness controlled by the depth of said material, and thereafter removing the cooled glass from the bath.

2. The method of claim 1 wherein said edge material is the same density as the glass and couples said glass to the side walls of the tank, the surface tension between the glass and the metal bath being less than the sum of the surface tensions between the edge material and the glass and the surface tension between the edge material and metal bath, and the surface tension between the glass and the atmosphere being less than the sum of the surface tension between the glass and the edge material and the surface tension between the edge material and the atmosphere, selecting the thickness of said layer of edge material so as to obtain a thickness of said glass other than equilibrium thickness obtained in the absence of said edge material, moving the glass from said portion of the tank, and thereafter cooling and removing said glass from the bath.

3. The method of claim 1 wherein said edge material is the same density as the glass and couples said glass to the side walls of the tank, the surface tension between the edge material and the metal bath being less than the sum of the surface tension between the edge material and the glass and the surface tension between the glass and the metal bath, and the surface tension between the edge material and the atmosphere being less than the sum of the surface tension between the edge material and the glass and the surface tension between the glass and the atmosphere, selecting the thickness of said layer of edge material so as to obtain a thickness of said glass other than equilibrium thickness obtained in the absence of said edge material, moving said glass from said portion of the tank, and thereafter cooling and removing said glass from the bath.

4. The method of claim 1 wherein said edge material is the same density as the glass and couples said glass to the side walls of the tank.

the surface tension between the edge material and the glass being less than the sum of the surface tension between the glass and the metal bath and the surface tension between the edge material and the metal bath, and the surface tension between the edge material and the glass being less than the sum of the surface tension between the glass and the atmosphere and the surface tension between the edge material and the atmosphere, selecting the thickness of said layer of edge material so as to obtained a thickness of said glass other than equilibrium thickness obtained in the absence of said edge material, moving said glass from said portion of the tank, and thereafter cooling and removing said glass from the bath.

5. The method of claim 1 wherein said edge material is of greater density than the glass and couples said glass to the side walls of the tank, the surface tension between the glass and the metal bath being less than the sum of the surface tension between the edge material and the glass and the surface tension between the edge material and the metal bath, the surface tension between the edge material and the atmosphere being less than the sum of the surface tension between the glass and the edge material and the surface tension between the glass and the atmosphere, selecting the thickness of said layer of edge material so as to obtain a thickness of said glass other than equilibrium thickness obtained in the absence of said edge material, moving the glass from said portion of the tank, and thereafter cooling and removing said glass from the bath.

6. The method of claim 1 wherein said edge material is of less density than the glass and couples said glass to the side walls of the tank, the surface tension between the glass and the atmosphere being less than the sum of the surface tension between the glass and the edge material and the surface tension between the edge material and the atmosphere, the surface tension between the edge material and the metal bath being less than the sum of the surface tension between the glass and the edge material and the surface tension between the glass and the metal bath, adjusting the thickness of said layer of edge material so as to obtain a thickness of said glass other than equilibrium thickness obtained in the absence of said edge material, moving the glass from said portion of the tank, and thereafter cooling and removing said glass from the bath.

7. A method as recited in claim 1 wherein said material is an alkali metal salt.

8. A method as recited in claim 1 wherein said material is sodium monomolybdate.

9. A method as recited in claim 1 wherein said material is an alkali metal molybdate.

10. A method as recited in claim 1 wherein said material is a low melting point glass.

11. A method as recited in claim 10 wherein said material has a composition, by weight of

| | Percent |
|---|---|
| $Na_2O$ | 17–26 |
| $SiO_2$ | 33–42 |
| $B_2O_3$ | 28–38 |
| $Na_2SiF_6$ | 0–13 |
| $NaF$ | 0–5 |

12. The method of claim 1 wherein the depth of said material is selected to insure production of glass having a thickness differing from equilibrium thickness obtained in the absence of said material.

References Cited

UNITED STATES PATENTS 3,317,299   5/1967   Bré _____ 65—99

FOREIGN PATENTS 1,342,165   9/1963   France.
1,370,772   7/1964   France.

OTHER REFERENCES

Kingery, Property Measurements at High Temperatures, John Wiley and Sons, Inc., New York, 1959.

Mitchell et al., "Measurement of Surface Tension of Glasses," The Glass Industry, vol. 33, #9, January 1952, pp. 453 to 523.

DONALL H. SYLVESTER, *Primary Examiner.*

G. R. MEYERS, *Assistant Examiner.*